(12) United States Patent
Miller

(10) Patent No.: US 7,390,042 B1
(45) Date of Patent: Jun. 24, 2008

(54) ADJUSTABLE STRAP FOR A PERSON TO CARRY A HEAVY LOAD

(76) Inventor: James W. Miller, P.O. Box 187, Colbert, WA (US) 99005

( * ) Notice: Subject to any disclaimer, the term of this patent is extended or adjusted under 35 U.S.C. 154(b) by 530 days.

(21) Appl. No.: 11/154,069

(22) Filed: Jun. 16, 2005

(51) Int. Cl.
*B65G 7/12* (2006.01)
(52) U.S. Cl. .................... 294/152; 294/150; 294/156
(58) Field of Classification Search ............. 294/15, 294/150, 152, 156, 74, 119.2
See application file for complete search history.

(56) References Cited

U.S. PATENT DOCUMENTS

| | | | | |
|---|---|---|---|---|
| 873,044 | A * | 12/1907 | Hanson | 294/74 |
| 1,344,932 | A | 6/1920 | Anderson | |
| 1,985,571 | A | 12/1934 | Hetzel | |
| 2,431,780 | A * | 12/1947 | Theal | 224/157 |
| 2,508,795 | A * | 5/1950 | Nielsen | 294/152 |
| 3,143,266 | A * | 8/1964 | Imatake | 294/152 |
| 3,211,489 | A * | 10/1965 | Gill | 294/31.2 |
| 3,958,731 | A * | 5/1976 | Riedle | 294/152 |
| 4,630,838 | A | 12/1986 | Stockton | |
| 5,503,448 | A * | 4/1996 | Dewey | 294/152 |
| 5,511,285 | A | 4/1996 | Bush et al. | |
| 5,833,292 | A * | 11/1998 | Lyons, Jr. | 294/152 |
| D430,376 | S * | 8/2000 | Bouchard et al. | D34/28 |
| 6,508,389 | B1 * | 1/2003 | Ripoyla et al. | 224/157 |
| 6,729,511 | B2 * | 5/2004 | Dent, III | 224/259 |
| 2005/0194804 | A1 * | 9/2005 | Isaacson, Jr. | 294/152 |

* cited by examiner

*Primary Examiner*—Dean J Kramer
(74) *Attorney, Agent, or Firm*—Donald R. Schoonover

(57) ABSTRACT

A strap includes an adjusting buckle near each end and a handle on each end. The length of the strap is adjusted using the buckles so a heavy load can be handled by a worker in a manner that permits the worker to safely carry the load in a variety of situations.

1 Claim, 1 Drawing Sheet

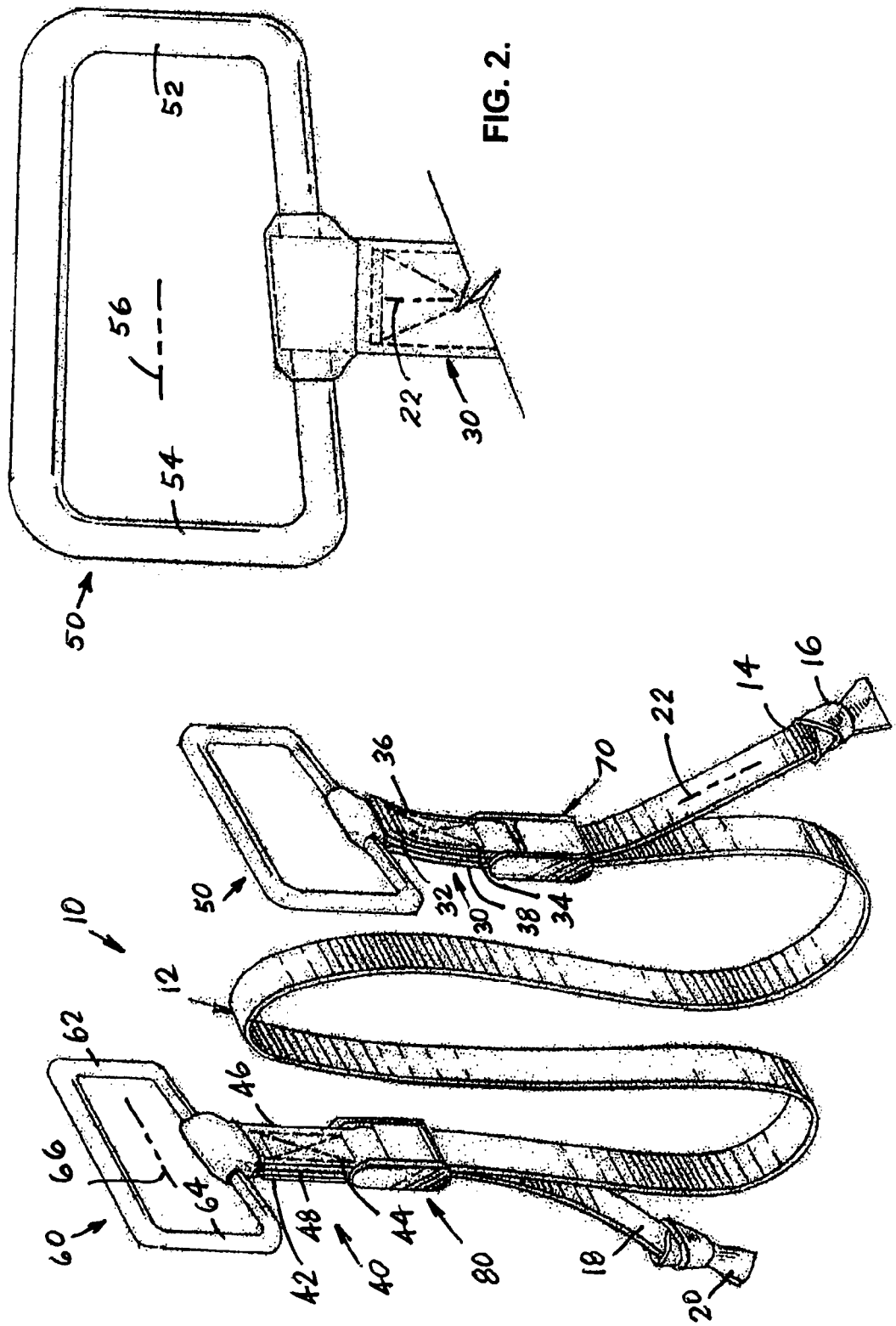

ADJUSTABLE STRAP FOR A PERSON TO CARRY A HEAVY LOAD

BACKGROUND OF THE INVENTION

1. Field of the Invention

The present invention relates to the general art of straps and belts, and to the particular field of straps used to carry bulky objects.

2. Description of the Related Art

Many workers, especially movers, must carry heavy items on their person. These items can be extremely heavy, especially in the case of movers who may be carrying furniture. Back injuries are quite common in such workers, especially after many years of heavy work. In fact, back injuries may be one of the leading causes of such workers changing jobs or retiring.

Many back injuries are caused by improper lifting or carrying techniques. Most workers are aware that they must lift heavy loads with their legs and not their back. However, once the load is lifted to the worker's body, many of the workers do not properly carry the load. This may cause injury as well.

Therefore, there is a need for a means for assisting a worker in properly carrying a load on his body.

One reason for improperly aligning a load on a worker is the device that is used for a worker to handle the load. Such devices include braces and belts and the like. However, these devices are generally not adjustable and, as such, may not be properly adjusted for the particular worker and the particular load and the particular task being carried out. In such a situation, the load may be improperly aligned on the worker.

Therefore, there is a need for a means for assisting a worker in properly carrying a load on his body and which can be adjusted to meet the needs of the particular situation.

Straps known to the inventor generally must be looped or tied about a worker's wrist in order to be handled by the worker. This may be uncomfortable and may interfere with the worker's blood circulation in his hands. Furthermore, this is not as secure as it could be.

Therefore, there is a need for a strap that can be used by a worker to handle a load and which overcomes the problems associated with the prior art.

PRINCIPAL OBJECTS OF THE INVENTION

It is a main object of the present invention to provide a means for assisting a worker in properly carrying a load on his body.

It is another object of the present invention to provide a means for assisting a worker in properly carrying a load on his body and which can be adjusted to meet the needs of the particular situation.

It is another object of the present invention to provide a means that is versatile enough to assist a worker in properly carrying a load on his body.

It is another object of the present invention to provide a strap that can be used by a worker to handle a load and which overcomes the problems associated with the prior art.

SUMMARY OF THE INVENTION

These, and other, objects are achieved by a strap that is adjustable over a wide range and which includes hand grips on each end and adjustment buckles near each end.

Using the adjustable strap embodying the present invention will permit a worker to handle heavy loads by himself in a manner that is effective and safe for the particular situation. Thus, for example, one situation may require the worker to bend while carrying the load which will require the load to be handled by the worker in one manner, while another situation may require the load to be carried over a long distance, which will require the load to be handled by the worker in a different manner. The strap embodying the present invention can be adjusted to meet the needs of any situation.

The hand grips included in the adjustable strap embodying the present invention permit a worker to securely grasp the strap with his hands thereby overcoming the above-discussed problems associated with the prior art known to the inventor.

BRIEF DESCRIPTION OF THE DRAWING FIGURES

FIG. 1 is a perspective view of an adjustable strap embodying the present invention.

FIG. 2 is an enlarged plan view of a handle which is attached to the strap shown in FIG. 1.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a load carrying strap 10 which achieves the above-discussed objectives.

Load carrying strap 10 comprises a nylon body 12 which is adapted for a worker to handle heavy loads, such as furniture or the like. Nylon body 12 has a first end 14 having a knot 16 thereon, a second end 18 having a knot 20 thereon, and a longitudinal axis 22 which extends between first end 14 and second end 18.

Nylon body 12 is between ten and fifteen feet long as measured between the first and second ends 14, 18 in the direction of longitudinal axis 22. The length of the body 12 permits it to be used for a worker to handle a variety of bulky loads.

A first body extension 30 has a first end 32 and a second end 34, as well as a first layer 36 and a second layer 38.

A second body extension 40 has a first end 42 and a second end 44, as well as a first layer 46 and a second layer 48. Extensions 30 and 40 can be nylon as well if desired.

A first hand grip 50 is fixed to first end 32 of first body extension 30. As can be understood from FIG. 2, first hand grip 50 is a skewed rectangle in peripheral shape with a first end 52, that is shorter than a second end 54 thereof, and a longitudinal axis 56 which extends between first end 52 and second end 54 of first hand grip 50 and which extends transverse to longitudinal axis 22 of nylon body 12.

A second hand rectangular grip 60 is identical to first grip 50 and is fixed to first end 42 of second body extension 40. Like grip 50, second grip 60 is a skewed rectangle in peripheral shape with a first end 62 thereof being shorter than a second end 64 thereof, and a longitudinal axis 66 which extends between first end 62 and second end 64 of second hand grip 60 and which extends transverse to longitudinal axis 22 of nylon body 12. The skewed shape of hand grips 50 and 60 allow the worker to securely grasp the strap 10 in a comfortable manner.

A first adjustment buckle 70 is attached to second end 34 of first body extension 30 and slidably accommodates portions of nylon body 12 adjacent to first end 14 of nylon body 12.

A second adjustment buckle 80 is attached to second end 44 of second body extension 40 and slidably accommodates portions of nylon body 12 adjacent to second end 18 of nylon body 12.

The sliding accommodation of the first and second adjustment buckles 70, 80 permits the length of strap 12 to be quickly and securely adjusted to accommodate a wide variety of situations so a load can be handled by a worker in a manner which is best suited to the particular situation. The hand grips 50, 60 permit a worker to securely grasp strap 12 without endangering his circulation.

Operation of strap 10 can be understood from the teaching of the foregoing disclosure. The worker adjusts the length of strap 12 using the adjustment buckles 70, 80 whereby the load and the particular situation are properly accounted for. A load is then lifted by the worker. The worker can grasp the handles 50, 60 if the load is placed on his body. Alternatively, strap 10 can be tied to itself adjacent to the ends 14 and 18 after encircling a portion of a load carrying device, such as dolly, to secure a heavy load, such as furniture, to the dolly. It is noted that the term "attached" as used herein is understood to mean that the worker grasps the handles 50, 60 and the body 12 of the strap 10 encircles the load to "attach" the load to the worker as will be understood by those skilled in the art. The term "attachment" used in conjunction with a dolly D is similarly defined.

Simply stated, the present invention comprises a carrying strap for assisting a worker with heavy and bulky items and other pieces of furniture that are too tall to be moved through doorways on a flat dolly. Also, the strap of the present invention may be used when a flat dolly or a dolly of any kind is not practical for use in certain hallways, doorways, or stairs. One of the primary uses of the strap of the present invention is for carrying and handling mattresses. The strap of the present invention is adjustable to an individual worker's needs for safely handling an item to be moved. The worker holds the handle in one hand and slides the strap under the item to be moved, making sure that the item is centered. Then the worker adjusts the length of the strap to his individual need for support and comfort. This helps the worker to lift and handle heavy objects without strain on his back or wrists.

It is understood that while certain forms of the present invention have been illustrated and described herein, it is not to be limited to the specific forms or arrangements of parts described and shown.

What is claimed and desired to be covered by Letters Patent is:

1. A load carrying strap comprising:
    a) a nylon body, said body adapted for a worker to handle heavy loads, said nylon body having
        (1) a first end having a knot thereon,
        (2) a second end having a knot thereon,
        (3) a longitudinal axis which extends between the first end and the second end, and
        (4) said nylon body being at least ten feet long as measured between the first end and the second end in the direction of the longitudinal axis;
    b) a first body extension having a first end and a second end and first and second layers;
    c) a second body extension having a first end and a second end and first and second layers;
    d) a first hand grip fixed to the first end of said first body extension, said first hand grip being a skewed rectangle in peripheral shape with a first end thereof being shorter than a second end thereof and a longitudinal axis which extends between the first end of said first hand grip and the second end of said first hand grip and which extends transverse to the longitudinal axis of said nylon body;
    e) a second hand grip fixed to the first end of said second body extension, said second hand grip being a skewed rectangle in peripheral shape with a first end thereof being shorter than a second end thereof and a longitudinal axis which extends between the first end of said second hand grip and the second end of said second hand grip and which extends transverse to the longitudinal axis of said nylon body;
    f) a first adjustment buckle attached to the second end of said first body extension and slidably accommodating portions of said nylon body adjacent to the first end of said nylon body; and
    g) a second adjustment buckle attached to the second end of said second body extension and slidably accommodating portions of said nylon body adjacent to the second end of said nylon body.

* * * * *